Dec. 8, 1953     R. E. JAMES, JR., ET AL     2,661,499
METHOD FOR SIZING NYLON SHAPES
Filed July 22, 1950
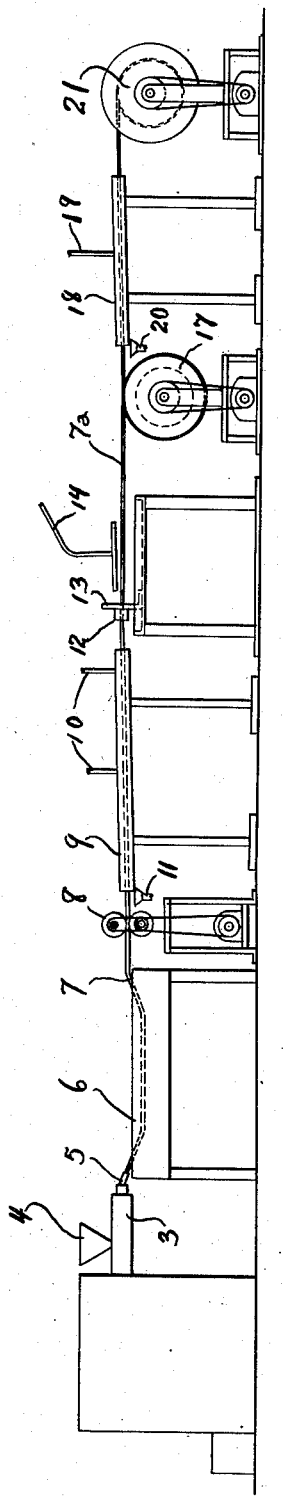
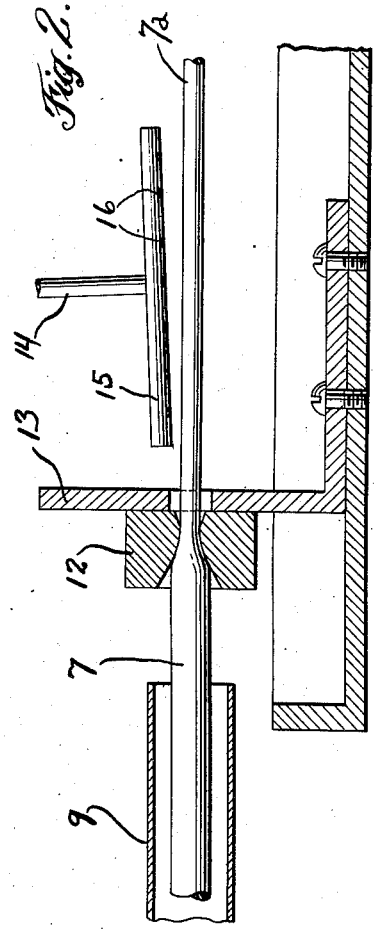
INVENTORS
Ralph E. James, Jr.
Robert B. Koch
BY
ATTORNEYS Patented Dec. 8, 1953

2,661,499

UNITED STATES PATENT OFFICE 2,661,499

METHOD FOR SIZING NYLON SHAPES

Ralph E. James, Jr., and Robert B. Koch, Reading, Pa., assignors to The Polymer Corporation, Reading, Pa., a corporation of Pennsylvania Application July 22, 1950, Serial No. 175,323

6 Claims. (Cl. 18—47.5)

1

This invention relates to the production of nylon shapes, especially small diameter rod stock and tubing.

One of the important objects of the invention is the production of rod stock or tubing of highly uniform dimensions. In this connection, it is mentioned that, for various reasons brought out more fully hereinbelow, certain of the polyamides are very difficult to accurately extrude or otherwise shape to a uniform diameter or cross-section. The invention is primarily concerned with a method according to which the rod stock or tubing is first formed and is thereafter subjected to a special sizing operation, as will be fully explained hereinafter.

Before considering the objects and advantages of the invention in detail, reference is here made to certain characteristics of nylon materials and to problems which arise because of such characteristics, in the production of rod stock or tubing.

It is first noted that the invention is especially concerned with the production of nylon shapes from the high melting polyamides, such as polyhexamethylene adipamide and polyhexamethylene sebacamide. The invention is of especial advantage in the fabrication of rod stock or tubing, not only because of the fact that rod stock or tubing formed of these polyamides constitute valuable products which are useful for many purposes, but also because of the fact that these polyamides present special problems in fabrication techniques, which problems are well met by the technique of the present invention.

The high melting polyamides are difficult to extrude with uniformity of diameter, because of surging of the molten material in the extrusion equipment, and also because of the fact that the high melting polyamides are characterized by the relatively low viscosity in the molten condition.

In addition the molecular structure of these polyamides is of such nature as to result in molecular orientation when the material is placed under tension, as in stretching or drawing. If a small diameter rod of the adipamide is placed under tension, as the tension increases the rod will "neck-down" first in the regions of smaller diameter and thereafter in the thicker portions of the rod, as the tension and stretching is increased, until the entire piece is completely oriented. Because of the characteristics referred to above, if the ordinary drawing techniques are used, the rod or tubing tends to orient and thus to neck-down at intervals as the rod or tubing is drawn from the drawing die. In fact, the ordinary drawing technique has been used with nylon shapes of very small diameter for the purpose of orienting the material, to thereby produce fibers or filaments of high tensile strength.

It is an object of the present invention to size previously formed rod stock or tubing by the use of a die in a novel manner providing for only a small reduction in diameter of the shape, this being accomplished without appreciable tendency to neck-down or completely orient the material. In this way it is possible to accurately size a previously formed rod or tube without appreciable change in the physical properties of the nylon; and, for this reason, the use of the die according to the present invention is not a "drawing" operation, but is more properly termed a "sizing" operation.

The nylon materials are also subject to growth after working, such growth sometimes taking place over appreciable periods of time, so that with a particular shape originally worked to a given diameter, after a matter of weeks or months of aging, it will be found that the shape no longer conforms with its original diameter, but has grown appreciably. The present invention also provides a treatment for promoting the growth in a short time, so that this treatment may be associated with the novel sizing operation of the invention, and thereby provide an overall method by which nylon rod stock or tubing may be produced, having uniform and stable dimensions.

How the foregoing and other objects and advantages are attained will appear more fully from the following description referring to the accompanying drawing, in which—

Figure 1 is an outline elevational view of equipment used according to the invention; and Figure 2 is an enlarged view of portions of the drawing mechanism shown in Figure 1.

As seen in Figure 1, the equipment includes an extruder device indicated at 3. The details of this device need not be considered herein since they form no part of the present invention per se. It may be mentioned, however, that this extruder may comprise a screw device working in a cylinder surrounded by heater elements. Nylon in flake or granular form may be delivered to the screw through the feed funnel 4. As the granular material is advanced by the screw it is melted and the molten material is extruded from a nozzle 5 into a water bath 6, wherein the material, for example the rod stock 7 is solidified.

Feed rolls such as indicated at 8 draw the material from the bath 6 and deliver it to the tube 9. As clearly seen in the drawing, the tube 9 is of substantially larger diameter than the extruded rod 7 and this tube is provided with one or more steam inlets such as indicated at 10. The tube 9 thus constitutes an elongated steaming chamber through which the extruded rod is drawn. The tube 9 is inclined downwardly to the left when viewed as in Figure 1, so that condensate will drain therefrom toward the left, to be carried away by the offtake 11.

The rod is then pulled through a die 12 mounted in any suitable manner as by the bracket 13, the die having a tapered reducing passage therethrough, providing for reduction in diameter of the rod, as is indicated at 7a in Figure 2.

Immediately adjacent the discharge end of the die there is arranged a water supply line 14 having a water distribution pipe or nozzle 15 associated therewith providing for delivery of water to the rod as it leaves the die. The nozzle 15 preferably has a number of apertures 16 discharging downwardly to constantly bathe the sized rod. In addition the left end of the nozzle tube 15 is open to provide a stream of water directed to the discharge opening of the die itself. The rod 7a leaving the die is advanced by means of a capstan 17 around the which the rod may be wound one or a few times. The capstan is of course adapted to be driven at an appropriate speed which will, of course, be somewhat higher than the rate of extrusion. Beyond the capstan 17 the rod passes through another steaming tube indicated at 18, which may be supplied with steam from the supply line 19. This tube is also inclined downwardly to the left and condensate is carried away by the drain 20.

In Figure 1 a take-up reel is indicated at 21, this reel preferably being driven through a slip clutch and being provided merely to wind up the material formed.

To consider the operation of the equipment above briefly described, assume that it is desired to form rod stock from polyhexamethylene adipamide, the rod stock to be .109" in diameter. For this purpose, the extruder may be operated to produce a rod of about .117" in diameter. The extruded rod, however, may not be uniform in diameter, because of surging or for other reasons, varying in diameter ±.008" in a typical case. The solidified rod drawn from the setting bath 6 is then drawn through the steaming tube 9 and is heated therein to a temperature approximating the boiling point of water. The rod thus enters the die at a temperature of about 212° F. It is also advantageous to position the end of the steaming tube 9 relatively close to the die 12, as shown in Figure 2, in order to provide for heating of the adjacent side of the die.

In the typical example here being considered, the die passage may have a diameter of .101", i. e., a diameter somewhat less than that desired in the finished rod. However, the reduction thereby effected is considerably less than that corresponding to the reduction which would occur upon complete orientation of the molecular structure of the polyamide. Indeed, in a typical operation the diameter of the rod leaving the die will ordinarily be slightly greater than the minimum diameter of the die passage. This is apparently due to a slight "spring-back" occurring immediately after leaving the die.

As the rod leaves the die it is subjected to rapid cooling in the water stream delivered by the nozzle tube 15. This is of great importance, since in the absence of such rapid cooling as the material leaves the die the rod will neck-down irregularly, thereby providing great irregularity in diameter. However, with the cooling referred to this tendency to neck-down is eliminated. It is of advantage in the arrangement of the cooling stream of water to provide for impingement of water against the exit side of the die. This also aids in overcoming tendency to neck-down.

The steaming treatment which occurs in the steaming tube 18 promotes the growth which tends to occur by aging and in the typical example here being considered, this steaming will result in growth of the drawn rod substantially to the desired diameter, i. e., .109", as above mentioned for illustrative purposes.

Instead of utilizing a steaming tube such as shown at 18 in Figure 1, the drawn material may be wound up on a take-up reel such as shown at 21 without steaming and the material may thereafter be subjected either to steaming or to treatment in a boiling water bath. As another alternative for this treatment, the sized material may be subjected to treatment in a hot air furnace adapted to heat the tubing or rod to a temperature of say from 225° F. to 275° F., for a period of time, say from 20 minutes to 45 minutes, depending upon the diameter or cross section of the shape being treated. In cases where the rod or tubing being formed is of substantial cross sectional dimension, it is preferred to employ a separate steaming, boiling water or hot air treatment, since greater time is required for the regrowth to the desired diameter than is practicable to provide in a continuous way, while sizing the material.

In connection with the use of the die it is again emphasized that the chilling of the material as it leaves the die is of great importance and we have found that highly reliable operation is obtained in this way, especially from the standpoint of providing rod of uniform diameter. Best results are obtained where the rod and the die are both heated at the admission side of the die and where both the rod and the die are chilled at the exit side of the die.

In connection with the steaming of the material in advance of the die, it is mentioned that steaming is preferred although heating in other ways may also be utilized. This heating operation is of importance in reducing the tendency for the material to break as it passes through the die. The temperature of steam (212° F.) is satisfactory for this purpose, although the temperature may be varied and may be either somewhat lower or may range upwardly considerably above 212° F.

The use of steam is particularly advantageous, not only because it constitutes a convenient heating medium but also because of the fact that the moisture tends to reduce spring-back immediately after the material leaves the die and still further tends to reduce subsequent regrowth upon aging.

It should be understood in connection with the foregoing that any other inert chilling medium may be utilized in place of the water above referred to, but water has been found highly effective when used at the ordinary temperatures available in water supply lines, for instance from about 35° to about 80° F.

With regard to the sizing operation it should be kept in mind that the technique of the invention is useful regardless of the manner in which the rod or tube is initially formed. Thus, this sizing operation may be used on rod or tubing made in some manner other than by the extruder such as indicated in Figure 1.

The sizing operation of the invention involves only a minor reduction in the die (as compared with that corresponding to full orientation), for the purpose of providing much more uniform diameter than is practicable in the production of such shapes merely by extrusion. For this purpose it is preferred that the material be extruded to an average diameter only slightly larger than the diameter ultimately desired, for example 5% larger than the desired diameter. The die is then utilized to reduce the diameter by only a minor amount, say 8 or 9%, after which the treatment to accelerate regrowth brings the diameter to the figure initially desired. When operating in accordance with this preferred technique the physical properties of the nylon material remain substantially unaffected.

The invention is of especial utility in the sizing of tubing and rod stock ranging in outside diameter from about .080" to about .300".

In addition to providing for production of rod stock and tubing of much more uniform diameter than has been practical heretofore from the polyamides, and especially the high melting polyamides, the invention has as a further advantage a flexibility in the production of rod stock and tubing of slightly different diameters from an extruded shape of given diameter. To accomplish this, all that need be done is to substitute a sizing die having a passage of different diameter. In cases where somewhat greater reduction is desired than is indicated in the typical example given above, several dies may be used in series, provided these dies are placed immediately adjacent to each other and provided further that the material is heated before entering the first die and is chilled immediately upon emergence from the last die.

It is to be understood that by the term "sizing" as used herein, reference is made not only to minor changes in cross sectional area but also to similar changes in cross sectional shape, or both.

EXAMPLES

In all of the examples given hereinafter, the material was steamed immediately prior to entrance into the die and was chilled with water upon leaving the die.

*Example 1*

Rod stock formed of polyhexamethylene aldipamide of initial diameter of .135"±.010 was passed through a die having a minimum diameter of .109" at a rate of 4000' per hour. Immediately after leaving the die, the rod had a diameter of .110"±.001. The material was then subjected to treatment in boiling water for 30 minutes, after which it had a diameter of .116"±.001.

*Example 2*

Polyhexamethylene adipamide rod of .145"±.010 was passed through a die having a minimum diameter of .116" at the rate of 4000' per hour. Immediately after leaving the die the material had a diameter of .118"±.001. After conditioning by boiling in water for 30 minutes, the rod had a diameter of .125"±.001.

*Example 3*

Polyhexamethylene adipamide rod of diameter .250"±.010 was passed through a die of diameter .215" at the rate of 2000' per hour. Immediately after leaving the die the material had a diameter of .217"±.002. This material was conditioned by boiling in water for one hour, and thereafter had a diameter of .229"±.002.

*Example 4*

Polyhexamethylene adipamide tubing having an average outside diameter of .175" and an average inside diameter of .146" was passed through a die having a minimum diameter of .120" at a rate of 4000' per hour. Immediately after leaving the die the material had an outside diameter of .121" and an inside diameter of .095", both of these diameters being maintained within very close limits along the tubing. After boiling for 20 minutes in water the outside diameter of the tube was .128".

*Example 5*

Polyhexamethylene adipamide tubing of the same initial outside and inside diameters as referred to in Example 4 was passed through a die having a minimum diameter of .114" at a rate of 4000' per hour. After leaving the die this material showed very uniform outside and inside diameters of .114" and .088", respectively. Uniformity of diameter was retained after the subsequently 20 minutes water boiling, the diameter at this time being .123".

*Example 6*

Polyhexamethylene adipamide tubing having an average outside diameter of .200" and an average inside diameter of .150" was passed through a die having a minimum diameter of .133" at a rate of 4000' per hour. After it left the die this tubing had a substantially uniform outside diameter of about .133" and a substantially uniform inside diameter of about .083". The tubing was boiled in water for 20 minutes, and the final outside diameter was .149", being quite uniform throughout the length of the tubing.

*Example 7*

Polyhexamethylene sebacamide rod having an average initial diameter of .112" was passed through a die having a minimum diameter of .070" at a rate of 5000' per hour. The diameter of this material was slightly less than that of the die upon leaving the die, but after 20 minutes boiling in water it had a diameter of .072".

We claim:

1. A method for making high melting polyamide tubing or rod stock of predetermined cross sectional dimension, which method comprises extruding stock of dimension greater than said predetermined dimension, pulling the extruded stock through a die of smaller minimum diameter than said predetermined dimension but of larger diameter than that of the same stock when completely oriented, preventing substantial orientation of the stock as it leaves the die by chilling the stock immediately upon exit of the stock from the die, and thereafter subjecting the stock to heating to effect increase in diameter thereof to said predetermined dimension.

2. A method for sizing high melting polyamide tubing and rod stock to a predetermined cross sectional dimension, comprising passing the stock through a reducing die having a die passage smaller than said predetermined dimension but substantially larger than the diameter of the same stock when completely oriented, and thereafter subjecting the stock to heat and moisture to effect increase in diameter thereof to said predetermined dimension.

3. A method according to claim 2 in which the stock is subjected to heat and moisture before entrance into the die and in which the stock is chilled as it leaves the exit side of the die.

4. A method for making close tolerance high melting polyamide tubing or rod stock of predetermined size, comprising continuously forming stock of size larger than said predetermined size, steam heating the stock, reducing the size of the stock to a size smaller than said predetermined size but larger than the size of the same stock when completely oriented by continuously passing the steamed stock through a reducing die having a die passage smaller than the predetermined size but larger than the size of the same stock when completely oriented, chilling the stock by applying a cooling medium to the stock as it leaves the die, and thereafter continuously heating the stock in the presence of moisture to incease the size of the reduced stock up to said predetermined size.

5. A method for making close tolerance high melting polyamide tubing or rod stock of predetermined size, comprising extruding stock of larger size than said predetermined size, reducing the size of the stock to a size smaller than predetermined size but larger than the size of the same stock when completely oriented by continuously pulling the stock through a reducing die having a passage of size smaller than said predetermined size but larger than the size of the same stock when completely oriented, the stock being pulled through the die at a temperature well below the melting point of the polyamide but not appreciably below 212° F., and thereafter heating the stock to effect increase in the size thereof up to said predetermined size.

6. A method for making close tolerance high melting polyamide tubing or rod stock of predetermined size, comprising extruding stock of larger size than said predetermined size, reducing the size of the stock to a size smaller than said predetermined size but larger than the size of the same stock when completely oriented, said reducing being effected by pulling the stock while heated through a reducing die having a passage of size smaller than said predetermined size but larger than the size of the same stock when completely oriented and by chilling the stock immediately upon exit from the die, and thereafter heating the stock to effect increase in the size thereof up to said predetermined size.

RALPH E. JAMES, Jr.
ROBERT B. KOCH.

References Cited in the file of this patent

UNITED STATES PATENTS

| Number | Name | Date |
| --- | --- | --- |
| 2,157,117 | Miles | May 9, 1939 |
| 2,194,313 | Loomis | Mar. 19, 1940 |
| 2,291,873 | Brubaker | Aug. 4, 1942 |
| 2,425,501 | Wiley | Aug. 12, 1947 |